US012619811B2

(12) United States Patent
Gao

(10) Patent No.: US 12,619,811 B2
(45) Date of Patent: May 5, 2026

(54) SIGNAL AND POWER INTEGRATED ANALOG ANALYSIS SYSTEM AND METHOD FOR FULL CHIP SYSTEM

(71) Applicant: J.W.MICROELECTRONICS TECHNOLOGY CO., LTD, Kunshan City (CN)

(72) Inventor: Xiao-Fang Gao, Kunshan City (CN)

(73) Assignee: J.W.MICROELECTRONICS TECHNOLOGY CO., LTD, Kunshan City (CN)

( * ) Notice: Subject to any disclaimer, the term of this patent is extended or adjusted under 35 U.S.C. 154(b) by 1159 days.

(21) Appl. No.: 17/567,908

(22) Filed: Jan. 4, 2022

(65) Prior Publication Data

US 2023/0214565 A1    Jul. 6, 2023

(51) Int. Cl.
 *G06F 30/3308*    (2020.01)
 *G06F 30/367*    (2020.01)
 *G06F 115/02*    (2020.01)
 *G06F 115/12*    (2020.01)
 *G06F 119/06*    (2020.01)
 *G06F 119/10*    (2020.01)
 *G06F 119/12*    (2020.01)
(52) U.S. Cl.
 CPC ........ *G06F 30/3308* (2020.01); *G06F 30/367* (2020.01); *G06F 2115/02* (2020.01); *G06F 2115/12* (2020.01); *G06F 2119/06* (2020.01); *G06F 2119/10* (2020.01); *G06F 2119/12* (2020.01)

(58) Field of Classification Search
None
See application file for complete search history.

(56) References Cited

U.S. PATENT DOCUMENTS

| 10,552,353 B1 * | 2/2020 | Farjadrad | ............ | G06F 13/4068 |
| 2006/0036980 A1 * | 2/2006 | Kobayashi | ............ | G06F 30/367 |
| | | | | 716/113 |
| 2019/0385057 A1 * | 12/2019 | Litichever | ............... | H04L 63/14 |

* cited by examiner

*Primary Examiner* — Rehana Perveen
*Assistant Examiner* — Eric A Post
(74) *Attorney, Agent, or Firm* — Chih Feng Yeh; Yongjean Consulting Inc.

(57)    ABSTRACT

A simulation system and a method thereof are disclosed. In the simulation system, a system power transmission model, and analog current time-domain model and digital current time-domain model are connected to obtain power noise generated after a supply current is obtained; jitter time-domain information of each interface connection circuit model under the power noise is obtained based on transmission of a clock signal outputted from a phase lock loop, by a simulation program; next, a voltage step response of a voltage measurement point when a clock terminal of each interface connection circuit model receives an ideal signal, is simulated by the simulation program to generate a first voltage time-domain model; a system waveform is generated based on the jitter time-domain information of each interface connection circuit model under the power noise, the first voltage time-domain model and data transmission, thereby obtaining an eye diagram and time-domain jitter distribution.

8 Claims, 5 Drawing Sheets

A signal channel model corresponding to each input/output power domain is generated based on design layouts of the package structure and the printed circuit board    210

A system power transmission model is generated based on the design layouts of the package structure and the printed circuit board, and distributions of power supply nodes on the layout of the SoC    220

An interface connection circuit model for each input/output power domain is established, wherein each interface connection circuit model includes a transmitter, the signal channel model corresponding to the transmitter, a receiver, a current measurement point and a voltage measurement point, wherein in two ends of the signal channel model are connected to the transmitter and the receiver, respectively, and the transmitter includes a data input terminal, a clock terminal, and an input/output power terminal, the current measurement point is disposed on the input/output power terminal, and the voltage measurement point is disposed on a connection part between the signal channel model and the receiver    230

A current step response of the current measurement point of each interface connection circuit model is simulated by a simulation program with integrated circuit emphasis (SPICE), to generate a first current time-domain model corresponding to the interface connection circuit model    240

A second current time-domain model is generated based on a response of the first current time-domain model corresponding to each of interface connection circuit models at the current measurement point when the data input terminal receives random data    250

A third current time-domain model is generated based on a current change of each of the power supply nodes of a digital circuit corresponding to a digital power domain    260

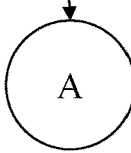

FIG. 2A

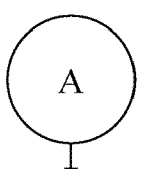

The system power transmission model, each of the second current time-domain models, and each of the third current time-domain models are connected to generate a complete power transmission model and obtain a power supply noise generated by the complete power transmission model after the complete power transmission model obtains a supply current      270

A clock signal outputted by a phase lock loop is recorded, wherein the phase lock loop is connected to each of the plurality of interface connection circuit models      280

A sensitivity of each interface connection circuit model to power is simulated by the SPICE based on the transmission of the clock signal outputted by the phase lock loop, to obtain jitter time-domain information of each of the plurality of interface connection circuit models under the power supply noise      290

A voltage step response of the voltage measurement point of each of the interface connection circuit models when the clock terminal receives an ideal signal, are simulated by the SPICE to generate a first voltage time-domain model      300

A system waveform corresponding to each of the interface connection circuit models is generated based on the jitter time-domain information of each of the interface connection circuit models under the power supply noise, the first voltage time-domain model corresponding to each of the plurality of interface connection circuit model, and transmission of the data in each of interface connection circuit models, to further obtain an eye diagram and a time-domain jitter distribution corresponding to each of the plurality of interface connection circuit models      310

FIG. 2B

SIGNAL AND POWER INTEGRATED ANALOG ANALYSIS SYSTEM AND METHOD FOR FULL CHIP SYSTEM

BACKGROUND

1. Technical Field

The present invention is related to a simulation system and a method, and more particularly to a simulation system integrating signal integrity and power integrity, and a method thereof.

2. Description of Related Arts

In recent years, high-end applications such as the Internet of Things, handheld systems, automotive electronics, high-speed computing and AI chips have emerged, and more and more functional blocks have been integrated into System on a Chip (SoC); when the working speed of ASIC and the data transmission rate of each input and output block in the special application in the SoC are getting higher and higher, the signal integrity and power integrity more and more affect each other.

The power integrity covers power supplies for an ASIC core and the input and output blocks and significantly depends on the optional mode of the SoC. Generally, the power supply for the ASIC core is also used to provide power for each of the input and output blocks, and the activity of the ASIC affects the signal quality of each of the input and output blocks through the power supply for the ASIC code.

Because the data transmission rate of each input and output block becomes higher and higher and the system bandwidth is limited, the jitters in the package and the printed circuit board are amplified; therefore, the system performance also needs to consider this effect. In addition, the crosstalk effect from the package and printed circuit board is also related to the operational mode of the SoC.

The conventional analysis method is to quantitatively analyze the independent performance requirements of input/output interface (that is, the input and output blocks), the package and the printed circuit board, and finally perform the integrated design of the full chip system, but it causes consumptions of a lot of unnecessary manpower and material resources and the wastage of area/power consumption. Therefore, it is necessary to develop an improved technical solution to solve the above-mentioned problems.

SUMMARY

An objective of the present invention is to provide a simulation system and a method thereof, to solve the conventional technology problem.

In order to achieve the objective, the present invention discloses a simulation system including a memory module and a processor. The memory module is configured to store a plurality of commands. The processor is configured to execute the plurality of commands stored in the memory module, to perform a simulation analysis program on a full chip system, wherein the full chip system comprises a package structure, a printed circuit board, and a system on a chip (SoC). The simulation analysis program includes a modeling module, a simulation module, a power noise module, a storage module, a jitter module, and an analysis module. The modeling module is configured to generate a plurality of signal channel models corresponding to a plurality of input/output power domains, respectively, based on design layouts of the package structure and the printed circuit board; generate a system power transmission model based on the design layouts of the package structure and the printed circuit board, and distributions of power supply nodes on a layout of the SoC; establish a plurality of interface connection circuit models for the plurality of input/output power domains, respectively; wherein each of the plurality of interface connection circuit models comprises a transmitter, a signal channel model corresponding to the transmitter, a receiver, a current measurement point and a voltage measurement point, in each of the plurality of interface connection circuit models, two ends of the signal channel model are connected to the transmitter and the receiver, respectively, and the transmitter comprises a data input terminal, a clock terminal, and an input/output power terminal, the current measurement point is disposed on the input/output power terminal, the voltage measurement point is disposed on a connection part between the signal channel model and the receiver; generate a second current time-domain model based on a response of a first current time-domain model corresponding to each of the plurality of interface connection circuit models at the current measurement point when the data input terminal receives random data; and generate a third current time-domain model based on a current change at each of the power supply nodes of a digital circuit corresponding to a digital power domain. The simulation module is connected to the modeling module and configured to simulate a current step response of the current measurement point in each of the plurality of interface connection circuit models, by a simulation program with integrated circuit emphasis (SPICE), to generate a first current time-domain model corresponding to the each of the plurality of interface connection circuit models; and simulate a voltage step response of the voltage measurement point when the clock terminal of each of the plurality of interface connection circuit models receives an ideal signal, by the SPICE, to generate a first voltage time-domain model corresponding to the each of the plurality of interface connection circuit models. The power noise module is connected to the modeling module and the simulation module and configured to connect to the system power transmission model, each of the plurality of second current time-domain models and each of the plurality of third current time-domain models, to generate a complete power transmission model, and obtain a power noise generated after the complete power transmission model obtains a supply current. The storage module is configured to record a clock signal outputted by a phase lock loop, wherein the phase lock loop is connected to each of the plurality of interface connection circuit models. The jitter module is connected to the storage module and the power noise module, and configured to simulate a sensitivity of each of the plurality of interface connection circuit models to power by the SPICE, based on transmission of the clock signal outputted from the phase lock loop, to obtain jitter time-domain information of each of the plurality of interface connection circuit models under the power noise. The analysis module is connected to the modeling module, the jitter module, and the simulation module, and configured to generate a system waveform corresponding to each of the plurality of interface connection circuit models, based on the jitter time-domain information of each of the plurality of interface connection circuit models under the power noise, the first voltage time-domain model corresponding to each of the plurality of interface connection circuit models, and data transmission in each of the plurality of interface connection circuit models, to obtain an eye diagram and a time-domain jitter distribution corresponding to each of the plurality of interface connection circuit models.

In order to achieve the objective, the present invention discloses a simulation method of performing a simulation analysis on a full chip system, and the full chip system includes a package structure, a printed circuit board and a system on a chip (SoC). The simulation method includes steps of: (a) generating a signal channel model corresponding to each of a plurality of input/output power domains based on design layouts of the package structure and the printed circuit board; (b) generating a system power transmission model based on the design layouts of the package structure and the printed circuit board, and the distributions of the power supply nodes on a layout of the SoC; (c) establishing an interface connection circuit model for each of the input/output power domains, wherein each of the interface connection circuit models comprises a transmitter, the signal channel model corresponding to the transmitter, a receiver, a current measurement point and a voltage measurement point, wherein in each of the plurality of interface connection circuit models, two ends of the signal channel model are connected to the transmitter and the receiver, respectively, and the transmitter comprises a data input terminal, a clock terminal and an input/output power terminal, the current measurement point is disposed on the input/output power terminal, and the voltage measurement point is disposed on a connection part between the signal channel model and the receiver; (d) simulating a current step response of the current measurement point of each of the interface connection circuit models, by a simulation program with integrated circuit emphasis (SPICE), to generate a first current time-domain model corresponding to the each of the interface connection circuit models; (e) generating a second current time-domain model based on a response of the first current time-domain model corresponding to each of the plurality of interface connection circuit models at the current measurement point when the data input terminal receives random data; (f) generating a third current time-domain model based on a current change of each of the power supply nodes of a digital circuit corresponding to a digital power domain; (g) connecting the system power transmission model, each of the plurality of second current time-domain models, and each of the plurality of third current time-domain models, to generate a complete power transmission model and obtain a power noise generated by the complete power transmission model after the complete power transmission model obtains a supply current; (h) recording a clock signal outputted from a phase lock loop, wherein the phase lock loop is connected to each of the plurality of interface connection circuit models; (i) simulating a sensitivity of each of plurality of interface connection circuit models to power by the SPICE based on the transmission of the clock signal outputted by the phase lock loop, to obtain jitter time-domain information of each of the plurality of interface connection circuit models under the power noise; (j) simulating a voltage step response of the voltage measurement point of each of the plurality of interface connection circuit models when the clock terminal receives an ideal signal, by the SPICE, to generate a first voltage time-domain model; (k) generating a system waveform corresponding to each of the interface connection circuit models based on the jitter time-domain information of each of the plurality of interface connection circuit models under the power noise, the first voltage time-domain model corresponding to each of the plurality of interface connection circuit model, and transmission of the data in each of interface connection circuit models, to further obtain an eye diagram and a time-domain jitter distribution corresponding to each of the plurality of interface connection circuit models.

According to the above-mentioned system and method of the present invention, the difference between the present invention and the conventional technology is that, in the simulation system of the present invention, the system power transmission model, and analog current time-domain model and digital current time-domain model are connected to obtain the power noise generated after the supply current is obtained, the jitter time-domain information of each interface connection circuit model under the power noise is obtained based on transmission of the clock signal outputted from the phase lock loop, by the simulation program; next, a voltage step response of a voltage measurement point when a clock terminal of each interface connection circuit model receives an ideal signal, is simulated by the SPICE to generate the first voltage time-domain model, and the system waveform is generated based on the jitter time-domain information of each interface connection circuit model under the power noise, the first voltage time-domain model and data transmission, thereby obtaining the eye diagram and the time-domain jitter distribution.

With the above-mentioned technical solution, the present invention is able to create abstract models of the full chip system, to perform simulation analysis of signal integrity and power integrity.

BRIEF DESCRIPTION OF THE DRAWINGS

The structure, operating principle and effects of the present invention will be described in detail by way of various embodiments which are illustrated in the accompanying drawings.

FIGS. 2A and 2B are flowcharts of an embodiment of a simulation analysis program executed by the simulation system of FIG. 1B, according to the present invention.

DETAILED DESCRIPTION

Figure 1A:
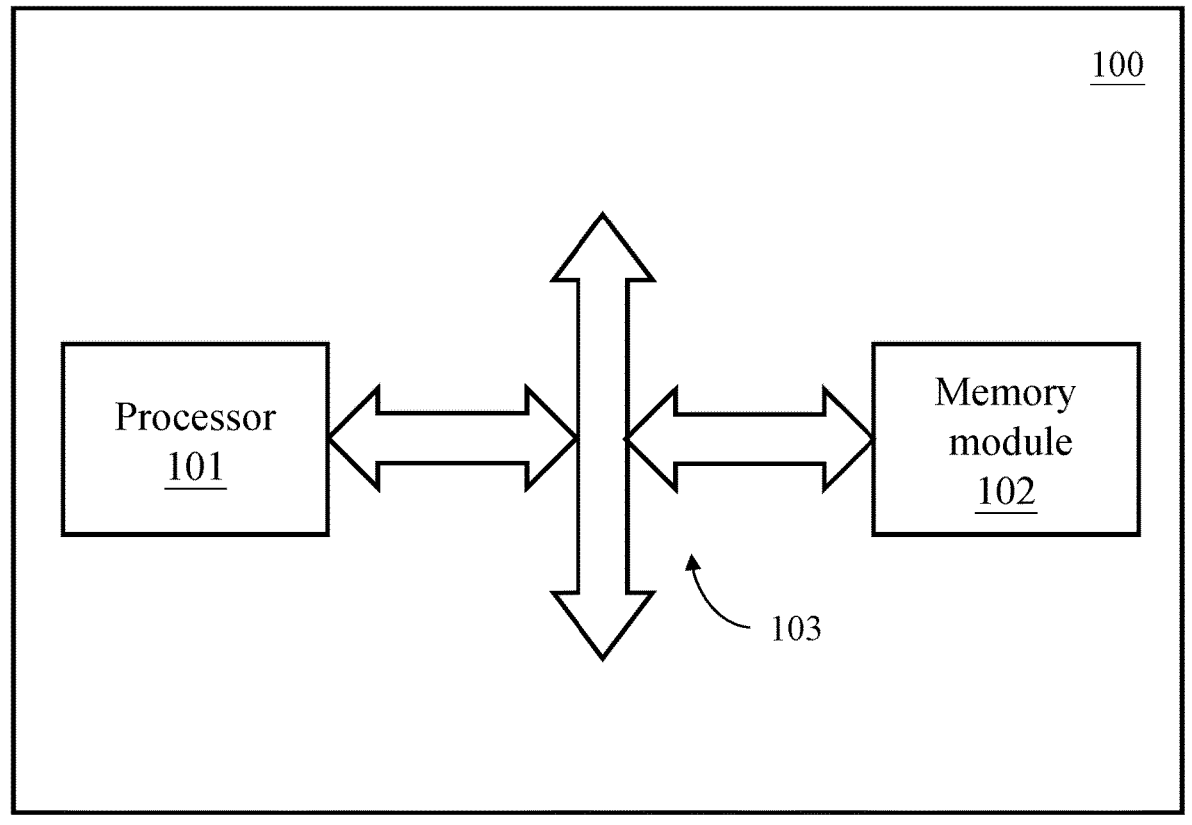
FIG. 1A is a schematic view of components of an embodiment of a simulation system, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The implementation of the present invention will be illustrated in detail with reference to the accompanying drawings and embodiment, so that the implementation process of applying the technical solution of the present invention to solve technical problem and achieve technical effect will be readily apparent as the same becomes better understood for implementation.

Figure 1B:
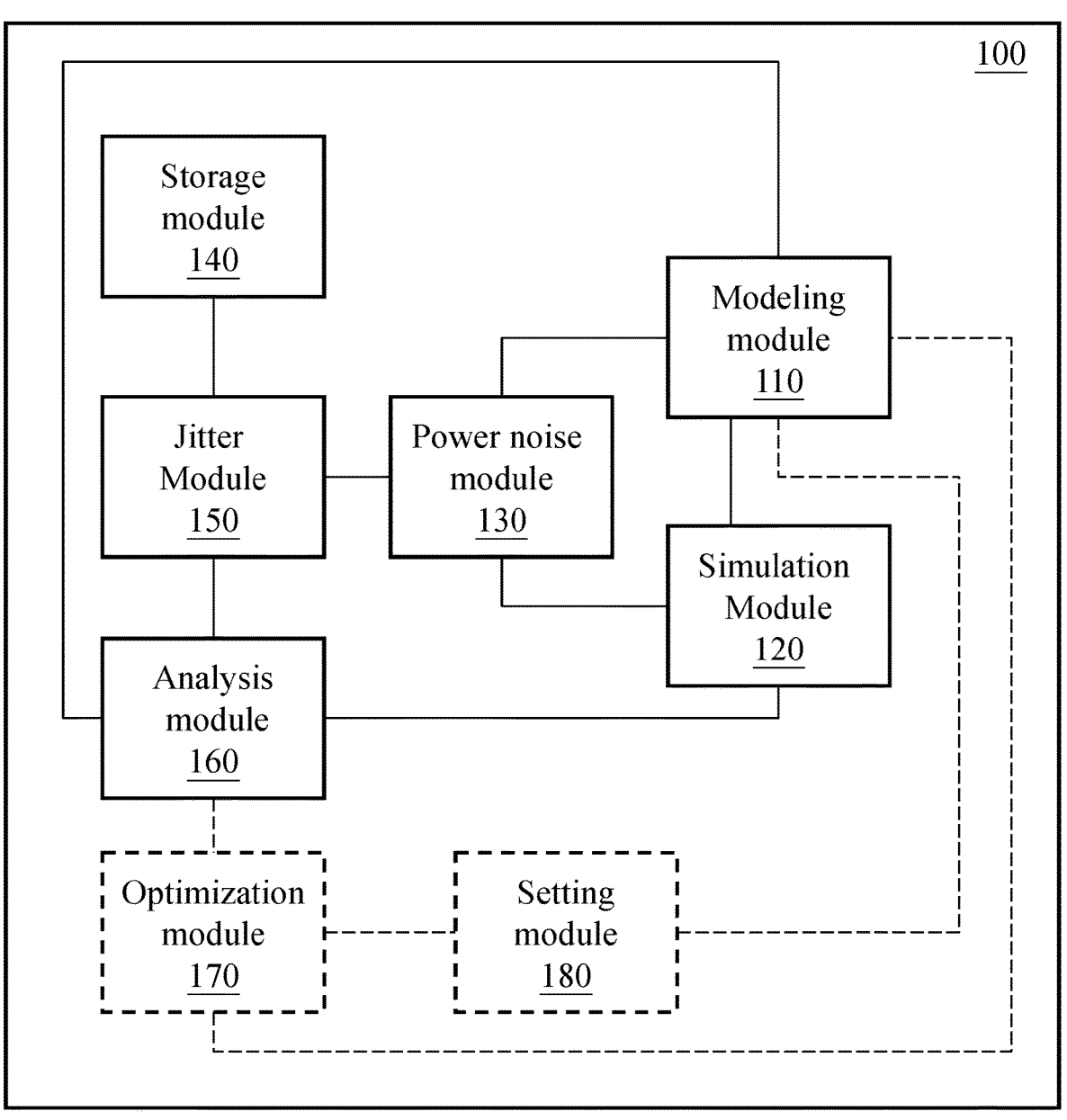
FIG. 1B is a system framework diagram of an embodiment of a simulation system, according to the present invention.

Please refer to FIGS. 1A and 1B. FIG. 1A is a schematic view of components of an embodiment of a simulation system, and FIG. 1B is a system framework diagram of an embodiment of a simulation system, according to the present invention. In this embodiment, a simulation system 100 includes hardware elements including at least one processor 101, at least one memory module 102, and a bus 103, but the present invention is not limited thereto. The bus 103 is connected to different hardware elements. With the configuration of the included hardware elements, the simulation system 100 can be applied to a computation device to execute software or application.

The bus 103 can include at least one type of bus, for example, the bus 103 can include at least one of a data bus, an address bus, a control bus, an expansion bus, and a local bus. The bus of a computation device can include, but not limited to, a parallel bus such as an ISA bus, a PCI bus, a VESA local bus, or a serial bus such as a USB, or a PCI-E bus.

In this embodiment, the processor 101 is coupled to the bus 103. The processor 101 can include a register group or a register space; the register group or the register space can be fully disposed on a processing chip, or partially disposed outside the processing chip and coupled to the processor 101 by means of dedicated electrical connection through the bus 103. The processor 101 can be a processing unit, a microprocessor or other appropriate processing device. When the simulation system 100 includes a plurality of processors, the plurality of processors can be the same types or similar types of processors coupled and communicated with each other through the bus 103. The processor 101 interprets a series of commands to perform specific computation or operation, such as mathematic computation, logic computation data, comparison, data copy, or data movement, thereby executing various application programs, modules and/or components.

Furthermore, the processor 101 can be coupled to a chipset, or electrically connected to the chipset through the bus 103. The chipset is formed by at least one integrated circuit (IC) and includes a memory controller and a peripheral input/output (I/O); that is, the memory controller and the peripheral I/O controller can be implemented in an integrated circuit, or implemented by two or more integrated circuits. The chipset generally provides input/output and memory management functions, and provides a general-purpose and/or dedicated register and a timer. The above-mentioned general-purpose and/or dedicated register and timer can be used or accessed by the at least one processor 101 coupled or electrically connected to the chipset.

In addition, the processor 101 can access the data stored in the memory module 102 and the mass storage element installed in the simulation system 100 through the memory controller. The above-mentioned memory module 102 includes any type of volatile memory and/or non-volatile memory, for example, the memory module 102 can include at least one of static random-access memory (SRAM), dynamic random-access memory (DRAM), flash memory, and read-only-memory (ROM). The above-mentioned mass storage element includes any type of storage devices or storage media, such as hard drives, optical discs, flash discs, flash memory, memory cards, and solid state disks (SSD) or any other storage devices. That is to say, the memory controller can access the data stored in static random access memory, dynamic random access memory, flash memory, hard disk drives, and solid state disks.

Furthermore, the processor 101 can be connected to and communicated with peripheral devices or interfaces (such as a peripheral output device, a peripheral input device, a communication interface or a GPS receiver) through a peripheral input/output controller via the bus 103. The peripheral input device can be any type of input device, such as a keyboard, a mouse, a track ball, a touch pad or a joystick; the peripheral output device can be any type of output device, such as a monitor or a printer; the peripheral input device and the peripheral output device can be implemented in the same device such as touch screens. The communication interface can include a wireless communication interface and/or a wired communication interface, for example, the wireless communication interface can support wireless local area network (such as Wi-Fi or Zigbee), Bluetooth, infrared, near field communication, mobile communication network (such as 3G/4G/5G), or other wireless data transmission protocol interface; the wired communication interface can include Ethernet device, asynchronous transmission mode (ATM) device, DSL modem, or cable modem. The processor 101 can periodically poll the peripheral devices and the interfaces to allow the simulation system 100 to input or output data through the interfaces and the peripheral devices.

As shown in FIG. 1B, the simulation system 100 includes a modeling module 110, a simulation module 120, a power noise module 130, a storage module 140, a jitter module 150 and an analysis module 160; the simulation system 100 can optionally include an optimization module 170 and a setting module 180. The modeling module 110, the simulation module 120, the power noise module 130, the storage module 140, the jitter module 150, the analysis module 160, the optimization module 170 and the setting module 180 are usually generated after the processor 101 executes the specific program loaded into the memory module 102, or the modules are included in the processor 101. In a practical implementation, the simulation system 100 can be applied to, but not limited to, a tablet computer, a desktop computer or a notebook computer.

Please refer to FIGS. 2A and 2B, which are flowcharts of an embodiment a simulation analysis program executed by the simulation system of FIG. 1B, according to the present invention. The simulation analysis program is executed to perform a simulation analysis for a full chip system, and the full chip system can include a package structure, a printed circuit board, and a system on a chip (SoC). In an embodiment, the simulation analysis program includes steps 210~310. In a step 210, a signal channel model corresponding to each of input/output power domains is generated based on design layouts of the package structure and the printed circuit board. In a step 220, a system power transmission model is generated based on the design layouts of the package structure and the printed circuit board, and distributions of power supply nodes on the layout of the SoC. In a step 230, an interface connection circuit model for each of the input/output power domains is established, wherein each of the interface connection circuit models includes a transmitter, the signal channel model corresponding to the transmitter, a receiver, a current measurement point and a voltage measurement point, wherein in each of the interface connection circuit models, two ends of the signal channel model are connected to the transmitter and the receiver, respectively, and the transmitter includes a data input terminal, a clock terminal, and an input/output power terminal, the current measurement point is disposed on the input/output power terminal, and the voltage measurement point is disposed on a connection part between the signal channel model and the receiver. In a step 240, a current step response of the current measurement point of each interface connection circuit model is simulated by a simulation program with integrated circuit emphasis (SPICE), to generate a first current time-domain model corresponding to the interface connection circuit model. In a step 250, a second current time-domain model is generated based on a response of the first current time-domain model corresponding to each of interface connection circuit models at the current measurement point when the data input terminal receives random data. In a step 260, a third current time-domain model is generated based on a current change of each of the power supply nodes of a digital circuit corresponding to a digital power domain. In a step 270, the system power transmission model, each of the plurality of second current time-domain models, and each of the plurality of third current time-domain models are connected to generate a complete power transmission model and obtain a power noise generated by the complete power transmission model after the complete power transmission model obtains a supply current. In a step 280, a clock signal outputted by a phase lock loop is recorded, wherein the phase lock loop is connected to each of the plurality of interface connection circuit models. In a step 290, a sensitivity of each interface connection circuit model to power is simulated by the SPICE based on the transmission of the clock signal outputted by the phase lock loop, to obtain jitter time-domain information of each of the plurality of interface connection circuit models under the power noise. In a step 300, voltage step responses of the voltage measurement point of each of the plurality of interface connection circuit models when the clock terminal receives an ideal signal, are simulated by the SPICE to generate a first voltage time-domain model. In a step 310, a system waveform corresponding to each of the interface connection circuit models is generated based on the jitter time-domain information of each of the plurality of interface connection circuit models under the power noise, the first voltage time-domain model corresponding to each of the plurality of interface connection circuit model, and transmission of the data in each of interface connection circuit models, to further obtain an eye diagram and a time-domain jitter distribution corresponding to each of the plurality of interface connection circuit models.

In a step 210, the modeling module 110 can apply scattering parameters (abbreviated as S parameters) or one to multiple stage resistance-inductance-capacitance-conductance (RLCG) circuit, to describe the package structure and the printed circuit board, thereby establishing abstract models of the package structure and the printed circuit board. In greater detail, the modeling module 110 establishes electrical performance models corresponding to the package structure based on a design layout of the package structure; for example, the electrical performance model includes a first power transmission model and a first signal transmission model, and model formats of the first power transmission model and the first signal transmission model are based on the S parameters or the RLCG circuits. The modeling module 110 establishes an electrical performance model corresponding to the printed circuit boards based on a design layout of the printed circuit board; the electrical performance model includes a second power transmission model and a second signal transmission model, and model formats of the second power transmission model and the second signal transmission model are based on the S parameters or the RLCG circuits. Next, the modeling module 110 connects the first signal transmission model and the second signal transmission model based on a connection relationship between the package structure and the printed circuit board, and then generates signal channel models respectively corresponding to the input/output power domains, based on division of the different input/output power domains of the input/output interface; in this case, the model format of the signal channel model corresponding to each of the input/output power domains can be based on the S parameters.

In the step 220, the modeling module 110 can apply one to multiple stage RLCG circuit to describe the layout of the SoC, thereby establishing an abstract model of the SoC. The modeling module 110 can apply the RLCG circuit to establish the third power transmission model corresponding to the SoC based on the distributions (that is, parasitic resistance, parasitic capacitance and parasitic inductance of metal interconnections in the SoC) of power supply nodes on the layout of the SoC, and then connect the first power transmission model, the second power transmission model and the third power transmission model based on power connection relationships (that is, practical power channels) between the package structure, the printed circuit board and the SoC, to generate a system power transmission model. In this case, the model format of the system power transmission model can be based on the S parameters; however, the present invention is not limited to this embodiment, for example, the model format of the system power transmission model can be based on impedance parameters (abbreviated as Z parameters).

Figure 3:
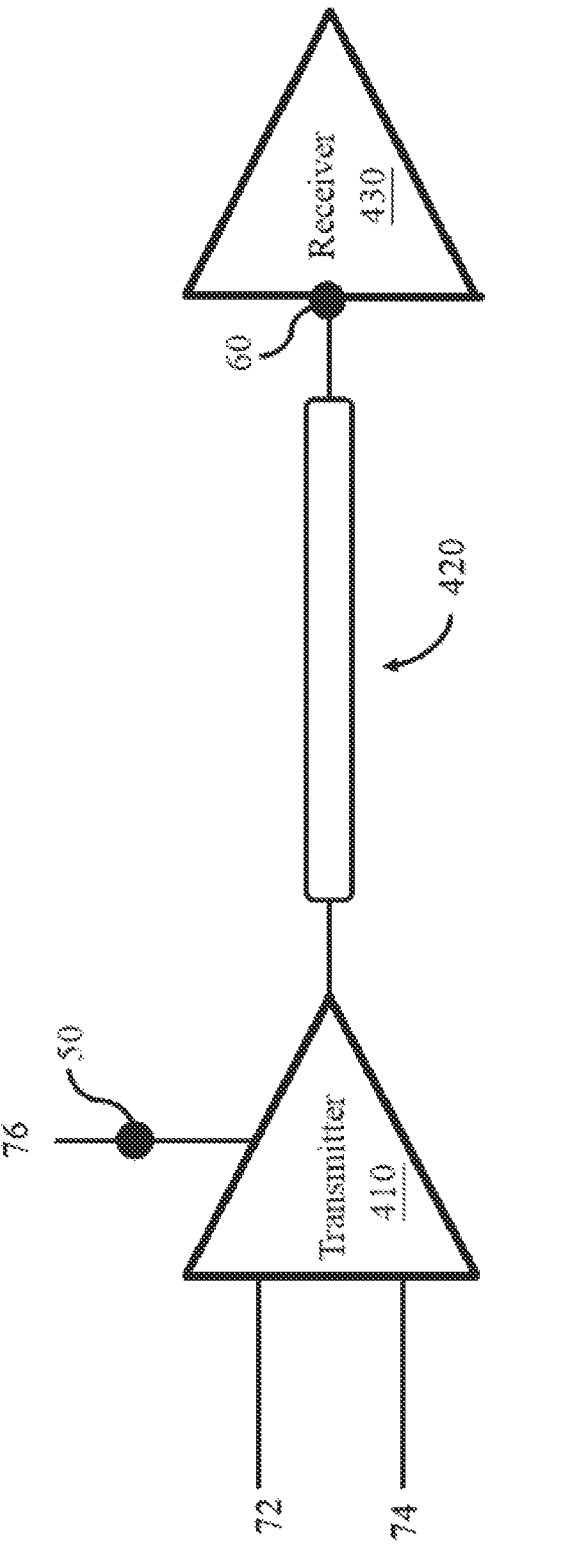
FIG. 3 is a schematic view of an embodiment of an interface connection circuit model, according to the present invention.

In the step 230, the modeling module 110 respectively establishes the interface connection circuit models for the input/output power domains of the SoC, as shown in FIG. 3, which is a schematic view of an embodiment of an interface connection circuit model of the present invention. Each interface connection circuit model includes a transmitter 410, a signal channel model 420 corresponding to the transmitter 410, a receiver 430, a current measurement point 50 and a voltage measurement point 60. In each interface connection circuit models, two ends of the signal channel model 420 are connected to the transmitter 410 and the receiver 430, respectively, and the transmitter 410 includes a data input terminal 72, a clock terminal 74, and an input/output power terminal 76, and the current measurement point 50 is disposed on the input/output power terminal 76, the voltage measurement point 60 is disposed on a connection part between the signal channel model 420 and the receiver 430. The data input terminal 72 is configured to receive the data to be transmitted through the transmitter 410, the clock terminal 74 is configured to receive the clock signal, and the input/output power terminal 76 is configured to receive electrical power from the input/output power domain.

In the step 240, through the simulation program with integrated circuit emphasis (SPICE), the simulation module 120 can simulate a current step response of the current measurement point 50 of each interface connection circuit model established by the modeling module 110, to generate a first current time-domain model corresponding to the interface connection circuit model. In greater detail, after the modeling module 110 establishes each of the interface connection circuit models through the SPICE, the simulation module 120 can simulate a current change at the current measurement point 50 when the data received by the data input terminal 72 is changed from 0 to 1 (that is, at a rising edge of a data signal), and simulate a current change of the current measurement point 50 when the data received by the data input terminal 72 is changed from 1 to 0 (that is, at a falling edge of the data signal). Therefore, the simulation module 120 simulates the current step response at each of the current measurement points 50, and respectively generate the first current time-domain model corresponding to the first interface connection models, based on the current step responses of the current measurement points 50.

In the step 250, the modeling module 110 generates the second current time-domain model based on the response of the first current time-domain model corresponding to each interface connection circuit models at the current measurement point 50 when the data input terminal 72 receives random data. In greater detail, when the simulation module 120 generates the first current time-domain model corresponding to each interface connection circuit model and the data input terminal 72 receives the random data such as "010010010001 . . . ", the modeling module 110 compares a current data bit and a previous data bit in the random data to obtain an interface data change corresponding to each first current time-domain model. Next, the modeling module 110 generates the second current time-domain model corresponding to each first current time-domain model based on the first current time-domain model corresponding to each interface connection circuit model, the current step response (that is, the simulation data in the step 240) of the current measurement point 50 of each first current time-domain model generated in the step 240, and the interface data change corresponding to each interface connection circuit model. When the current data bit and the previous data bit of the random data are the same (that is, there is no change), a current of the current measurement point 50 of the first current time-domain model is zero.

In the step 260, the modeling module 110 generates a third current time-domain model based on a current change on each of the power supply nodes of a digital circuit corresponding to a digital power domain. In greater detail, the modeling module 110 applies a VCD file to find the data change of each of power supply nodes in the digital circuit, and inquiries a standard cell library to find the current step response (that is, the current change when the data at each power supply node is changed from 0 to 1, or from 1 to 0) of any standard cell at each power supply node, to generate a current time-domain model of each of the power supply nodes in the standard cell under the data change. Next, the modeling module 110 obtains the current change of each of the power supply nodes by a linear superposition method based on the standard cells belonged to the power supply node, thereby generating a third current time-domain model.

In the step 270, the power noise module 130 connects the system power transmission model, each of the second current time-domain models, and each of the third current time-domain models, to generate the complete power transmission model, and further obtain the power noise generated after the complete power transmission model obtains the supply current. In other words, after the complete power transmission model is generated, the power noise module 130 can make the complete power transmission model obtain the supply current, thereby obtaining the power noise.

In the step 280, the storage module 140 records the clock signal outputted by a phase lock loop (PLL) of the SoC, the phase lock loop is connected to each interface connection circuit model; in other words, the storage module 140 records time-domain information corresponding to clock edges of the clock signal outputted from the phase lock loop, that is, the storage module 140 records clock edges of the practical waveform outputted from the phase lock loop, and the clock edge is one of a rising edge and a falling edge of the clock signal.

In the step 290, through the SPICE, the jitter module 150 can simulate the sensitivity of each interface connection circuit model to power based on the transmission of the clock signal outputted from the phase lock loop (that is, the transmission of the clock signal from the phase lock loop to the transmitter 410), to obtain jitter time-domain information of each interface connection circuit model under the power noise. The jitter module 150 can superposition all jitter time-domain information and the time-domain information corresponding to the clock edges of the clock signal outputted from the phase lock loop in the step 280, to generate the practical jitter time-domain information of the entire system.

In the step 300, through the SPICE, the simulation module 120 simulates the voltage step response of the voltage measurement point 60 when the clock terminal 74 of each interface connection circuit model receives the ideal signal (that is the ideal clock signal), to generate the first voltage time-domain model corresponding to the interface connection circuit model. In greater detail, through the SPICE, the simulation module 120 simulates the voltage change of the voltage measurement point 60 when the clock terminal 74 of each interface connection circuit model receives the ideal clock signal and the data received by the data input terminal 72 of each interface connection circuit model is changed from 0 to 1, and simulates the voltage change of the voltage measurement point 60 when the clock terminal 74 of each interface connection circuit model receives the ideal clock signal and the data received by the data input terminal 72 of each interface connection circuit model is changed from 1 to 0, so that the simulation module 120 can simulate the voltage step response of each of the voltage measurement point 60 when the clock terminal 74 of each interface connection circuit model receives the ideal signal (that is, the ideal clock signal), and generate the first voltage time-domain model corresponding to the interface connection circuit model based on the voltage step response of each voltage measurement point 60.

In the step 310, the analysis module 160 generates the system waveform corresponding to each interface connection circuit model based on the jitter time-domain information of each interface connection circuit model generated in the step 290 under power noise, the first voltage time-domain model generated in the step 300 and corresponding to each interface connection circuit model, and transmission of the data in each interface connection circuit model, thereby generating an eye diagram and a time-domain jitter distribution corresponding to each interface connection circuit model.

Through aforementioned steps, the present invention is able to establish the abstract models of the full chip system and perform the simulation analysis of signal integrity and power integrity on the abstract models. In other words, the present invention enable the quantitative analysis to be performed according to requirement in performance of the full chip system, that is, quantitative analysis can be performed according to the performance requirement for the whole system including the input/output interface, the package and the printed circuit board, thereby preventing the waste of area/power consumption in final system integration because of the analyses performed according to independent performance requirements for the input/output interface, the package and the printed circuit board.

Furthermore, in an embodiment, a setting program can be performed before the simulation analysis program including the steps 210 to 310. The setting program can include steps of receiving and setting a capacitance value of a de-coupling capacity between the input/output circuit corresponding to each input/output power domain and the digital circuit in the SoC, and receiving and setting the preset eye diagram standard corresponding to each input/output circuit. A setting module 180 can be connected to the modeling module 110 and execute the above-mentioned setting program. The de-coupling capacity of the SoC is configured to reduce the impact caused by power jitters.

In addition, in this embodiment, an optimization program can be performed after the simulation analysis program including the steps 210 to 310, and the optimization program can include steps of: determining whether the eye diagram corresponding to each of the input/output circuits is compliant with the preset eye diagram standard; when the eye diagram corresponding to one of the input/output circuits is not compliant with the preset eye diagram standard, adjusting the capacitance value of the de-coupling capacitor between the one of the input/output circuits and the digital circuit, and re-executing the simulation analysis program until the eye diagram corresponding to the one of the input/output circuits is compliant with the preset eye diagram standard. The optimization module 170 can be connected to the analysis module 160 and the setting module 180, and execute the above-mentioned optimization program. Each preset eye diagram standard includes at least one of an eye wide standard and an eye height standard.

Through the optimization program, adjusting the capacitance value of each de-coupling capacity of the SoC can reduce the impact caused by power jitters, and reduce the amount of the de-coupling capacities required in the conventional simulation method, thereby preventing from area waste caused by using excessive de-coupling capacities.

According to above-mentioned contents, the difference between the present invention and the conventional technology is that, in the simulation system of the present invention, the system power transmission model, and analog current time-domain model and digital current time-domain model are connected to obtain the power noise generated after the system power transmission model obtains the supply current, the jitter time-domain information of each interface connection circuit model under the power noise is obtained based on transmission of the clock signal outputted from the phase lock loop, by the simulation program; next, the voltage step response of a voltage measurement point when a clock terminal of each interface connection circuit model receives an ideal signal, is simulated by the SPICE to generate the first voltage time-domain model, and the system waveform is generated based on the jitter time-domain information of each interface connection circuit model under the power noise, the first voltage time-domain model and data transmission, thereby obtaining the eye diagram and the time-domain jitter distribution. With the above-mentioned technical solution, the present invention is able to create the abstract models of the full chip system, to perform simulation analysis of signal integrity and power integrity. In other words, the present invention enables the quantitative analysis to be performed according to requirement in performance of the full chip system, that is, the quantitative analysis can be performed according to the performance requirement for the whole system including the input/output interface, the package and the printed circuit board, thereby preventing from waste of area/power consumption in final system integration because of the analyses according to independent performance requirements for the input/output interface, the package and the printed circuit board.

Furthermore, the optimization program of the present invention can reduce the impact caused by power jitters and reduce the amount of the used de-coupling capacities by means of adjusting the capacitance value of the de-coupling capacity of the SoC, thereby preventing from area waste caused by using excessive de-coupling capacities.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A simulation system, comprising:
a memory module configured to store a plurality of commands;
a processor configured to execute the plurality of commands stored in the memory module, to perform a simulation analysis program on a full chip system, wherein the full chip system comprises a package structure, a printed circuit board, and a system on a chip (SoC), and the simulation analysis program comprises executing the following steps:
generating a plurality of signal channel models corresponding to a plurality of input/output power domains, respectively, based on design layouts of the package structure and the printed circuit board;
generating a system power transmission model based on the design layouts of the package structure and the printed circuit board, and distributions of power supply nodes on a layout of the SoC;
establishing a plurality of interface connection circuit models for the plurality of input/output power domains, respectively;
wherein each of the plurality of interface connection circuit models comprises a transmitter, a signal channel model corresponding to the transmitter, a receiver, a current measurement point and a voltage measurement point, in each of the plurality of interface connection circuit models, two ends of the signal channel model are connected to the transmitter and the receiver, respectively, and the transmitter comprises a data input terminal, a clock terminal, and an input/output power terminal, the current measurement point is disposed on the input/output power terminal, the voltage measurement point is disposed on a connection part between the signal channel model and the receiver;

generating a second current time-domain model based on a response of a first current time-domain model corresponding to each of the plurality of interface connection circuit models at the current measurement point when the data input terminal receives random data;

when the data input terminal of the first current time-domain model corresponding to each of the plurality of interface connection circuit models receives the random data, comparing a current data bit and a previous data bit in the random data, to obtain an interface data change corresponding to each of the plurality of first current time-domain models;

generating the second current time-domain model corresponding to each of the plurality of first current time-domain models, based on the first current time-domain model corresponding to each of the plurality of interface connection circuit models, and the current step response of the current measurement point of each of the plurality of first current time-domain models and the interface data change corresponding to each of the plurality of first current time-domain models;

wherein when the current data bit is the same as the previous data bit, a current of the current measurement point of the first current time-domain model is zero; and generating a third current time-domain model based on a current change at each of the power supply nodes of a digital circuit corresponding to a digital power domain;

simulating a current step response of the current measurement point in each of the plurality of interface connection circuit models, by a simulation program with integrated circuit emphasis (SPICE), to generate a first current time-domain model corresponding to the each of the plurality of interface connection circuit models; and simulating a voltage step response of the voltage measurement point when the clock terminal of each of the plurality of interface connection circuit models receives an ideal signal, by the SPICE, to generate a first voltage time-domain model corresponding to the each of the plurality of interface connection circuit models;

connecting to the system power transmission model, each of the plurality of second current time-domain models and each of the plurality of third current time-domain models, to generate a complete power transmission model, and obtain a power noise generated after the complete power transmission model obtains a supply current;

recording a clock signal outputted by a phase lock loop, wherein the phase lock loop is connected to each of the plurality of interface connection circuit models; and simulating a sensitivity of each of the plurality of interface connection circuit models to power by the SPICE, based on transmission of the clock signal outputted from the phase lock loop, to obtain jitter time-domain information of each of the plurality of interface connection circuit models under the power noise; and generating a system waveform corresponding to each of the plurality of interface connection circuit models, based on the jitter time-domain information of each of the plurality of interface connection circuit models under the power noise, the first voltage time-domain model corresponding to each of the plurality of interface connection circuit models, and data transmission in each of the plurality of interface connection circuit models, to obtain an eye diagram and a time-domain jitter distribution corresponding to each of the plurality of interface connection circuit models.

2. The simulation system according to claim 1, wherein a format of each of the plurality of signal channel models is based on S parameters, and a format of the system power transmission model is based on one of the S parameters and Z parameters.

3. The simulation system according to claim 1, wherein the simulation analysis program comprises executing the following steps:

applying a VCD file to find a data change at each of the power supply nodes in the digital circuit;

applying a standard cell library to find the current step response at each of the power supply nodes in any one of standard cells, to generate a current change at each of the power supply nodes in the any one of standard cells under the data change; and obtaining the current change of each of the power supply nodes by a linear superposition method, based on the standard cells belonged to each of the power supply nodes, to generate the third current time-domain model.

4. The simulation system according to claim 1, wherein the processor executes the plurality of commands stored in the memory module to perform a setting program before the simulation analysis program, and the setting program comprises executing the following steps:

receiving and set a capacitance value of a de-coupling capacity between the digital circuit and an input/output circuit corresponding to each of input/output power domains in the SoC, and set a preset eye diagram standard corresponding to each of the input/output circuits;

wherein the processor executes the plurality of commands stored in the memory module to perform an optimization program after the simulation analysis program, and the optimization program comprises:

determining whether the eye diagram corresponding to each of the input/output circuits is compliant with the preset eye diagram standard, wherein when determining that the eye diagram corresponding to one of the input/output circuits is not compliant with the preset eye diagram standard, adjusting the capacitance value of the de-coupling capacitor between the one of the input/output circuits and the digital circuit, and re-execute the simulation analysis program until determining that the eye diagram corresponding to the one of the input/output circuits is compliant with the preset eye diagram standard.

5. A simulation method of performing a simulation analysis on a full chip system, wherein the full chip system comprises a package structure, a printed circuit board and a system on a chip (SoC), and the simulation method comprises steps of:

(a): generating a signal channel model corresponding to each of a plurality of input/output power domains based on design layouts of the package structure and the printed circuit board;

(b): generating a system power transmission model based on the design layouts of the package structure and the printed circuit board, and the distributions of the power supply nodes on a layout of the SoC;

(c): establishing an interface connection circuit model for each of the input/output power domains, wherein each of the interface connection circuit models comprises a transmitter, the signal channel model corresponding to the transmitter, a receiver, a current measurement point and a voltage measurement point, wherein in each of the plurality of interface connection circuit models, two ends of the signal channel model are connected to the transmitter and the receiver, respectively, and the transmitter comprises a data input terminal, a clock terminal and an input/output power terminal, the current measurement point is disposed on the input/output power terminal, and the voltage measurement point is disposed on a connection part between the signal channel model and the receiver;

(d): simulating a current step response of the current measurement point of each of the interface connection circuit models, by a simulation program with integrated circuit emphasis (SPICE), to generate a first current time-domain model corresponding to the each of the interface connection circuit models;

(e): generating a second current time-domain model based on a response of the first current time-domain model corresponding to each of the plurality of interface connection circuit models at the current measurement point when the data input terminal receives random data;

when the data input terminal of the first current time-domain model corresponding to each of the plurality of interface connection circuit models receives the random data, comparing a current data bit and a previous data bit in the random data, to obtain an interface data change corresponding to each of the plurality of first current time-domain models, wherein when the current data bit is the same as the previous data bit, a current of the current measurement point of the first current time-domain model is zero;

generating the second current time-domain model corresponding to each of the plurality of first current time-domain models, based on the first current time-domain model corresponding to each of the plurality of interface connection circuit models, and the current step response of the current measurement point of each of the plurality of first current time-domain models and the interface data change corresponding to each of the plurality of first current time-domain models (f): generating a third current time-domain model based on a current change of each of the power supply nodes of a digital circuit corresponding to a digital power domain;

(g): connecting the system power transmission model, each of the plurality of second current time-domain models, and each of the plurality of third current time-domain models, to generate a complete power transmission model and obtain a power noise generated by the complete power transmission model after the complete power transmission model obtains a supply current;

(h): recording a clock signal outputted from a phase lock loop, wherein the phase lock loop is connected to each of the plurality of interface connection circuit models;

(i): simulating a sensitivity of each of plurality of interface connection circuit models to power by the SPICE based on the transmission of the clock signal outputted by the phase lock loop, to obtain jitter time-domain information of each of the plurality of interface connection circuit models under the power noise;

(j): simulating a voltage step response of the voltage measurement point of each of the plurality of interface connection circuit models when the clock terminal receives an ideal signal, by the SPICE, to generate a first voltage time-domain model; and (k): generating a system waveform corresponding to each of the interface connection circuit models based on the jitter time-domain information of each of the plurality of interface connection circuit models under the power noise, the first voltage time-domain model corresponding to each of the plurality of interface connection circuit model, and transmission of the data in each of interface connection circuit models, to further obtain an eye diagram and a time-domain jitter distribution corresponding to each of the plurality of interface connection circuit models.

6. The simulation method according to claim 5, wherein a format of each of the plurality of signal channel models is based on S parameters, and a format of the system power transmission model is based on one of the S parameters and Z parameters.

7. The simulation method according to claim 5, wherein the step (f) comprises steps of:

applying a VCD file to find a data change at each of the power supply nodes in the digital circuit;

applying a standard cell library to find the current step response at each of the power supply nodes in any one of standard cells, to generate a current change at each of the power supply nodes in the any one of standard cells under the data change; and obtaining the current change of each of the power supply nodes by a linear superposition method, based on the standard cells belonged to each of the power supply nodes, to generate the third current time-domain model.

8. The simulation method according to claim 5, wherein before the step (a), the simulation method comprises steps of:

receiving and setting a capacitance value of a de-coupling capacity between an input/output circuit corresponding to each input/output power domain and the digital circuit in the SoC; and after the step (k), the simulation method comprises steps of:

determining whether the eye diagram corresponding to each of the input/output circuits is compliant with the preset eye diagram standard; and when the eye diagram corresponding to the input/output circuit is not compliant with the preset eye diagram standard, adjusting the capacitance value of the de-coupling capacity between the input/output circuit and the digital circuit, and executing the step (a) to the step (k) again until the eye diagram corresponding to the input/output circuit is compliant with the preset eye diagram standard.

* * * * *